J. PAVEY & M. MARTIN.
Improvement in Wagon-Brakes.
No. 130,439. Patented Aug. 13, 1872.
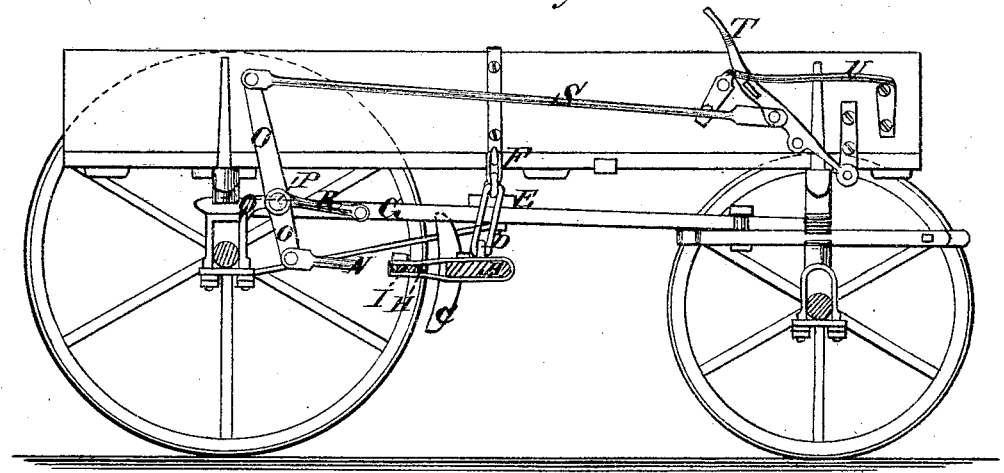
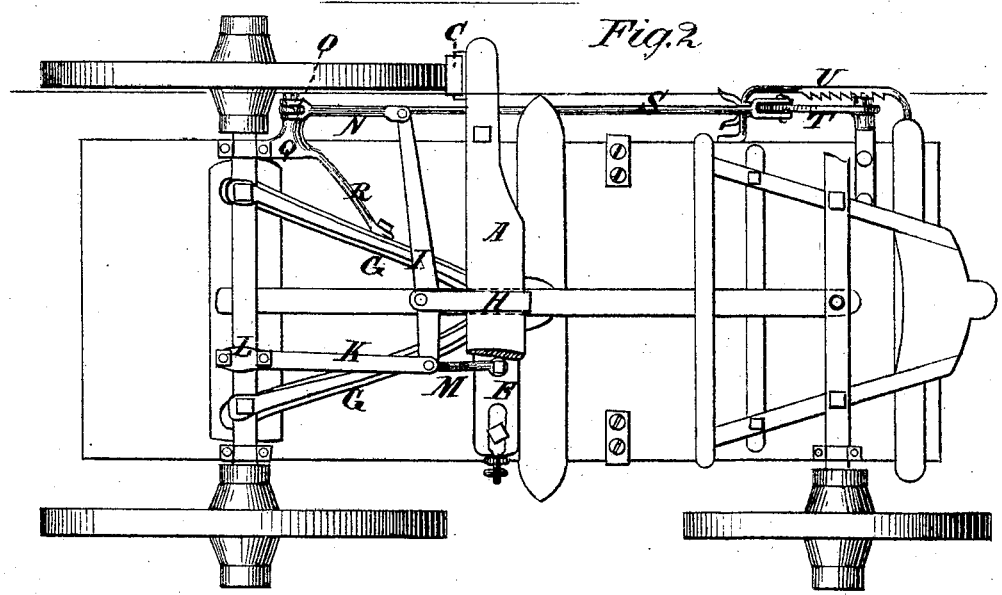

UNITED STATES PATENT OFFICE.

JOSEPH PAVEY AND MARSHALL MARTIN, OF WALLA WALLA, WASHINGTON TERRITORY.

IMPROVEMENT IN WAGON-BRAKES.

Specification forming part of Letters Patent No. 130,439, dated August 13, 1872.

Specification describing a new and Improved Wagon-Brake, invented by JOSEPH PAVEY and MARSHALL MARTIN, of Walla Walla, in the county of Walla Walla and Territory of Washington.

Our invention relates to improvement in a class of wagon-brakes, wherein the brake-bar is suspended below the reach of the wagon; and it consists in the arrangement of certain devices, as hereinafter described.

Figure 1 is a longitudinal sectional elevation of a wagon provided with our improved brake apparatus, and Fig. 2 is a plan of the bottom, with some parts broken out to show the arrangement clearly.

Similar letters of reference indicate corresponding parts.

A is the brake-bar, extending in front of the two hind wheels, with shoes C to act on them. It is suspended, by links D, from the bar E, and other links, F, from the box. The said bar E is placed above the hounds G and the reach and fastened to them. At the center this brake-bar A is connected by the yoke H with the lever I, which is pivoted at one end to the front end of the bar K, connected to the hind axle by a clip at L, and, projecting forward nearly to the brake-bar, is connected at its front end with the bar E by a brace, M, which serves to strengthen both of the said bars. This lever I extends from bar K across the reach to the opposite side of the wagon, and is there connected by the rod N to the short arm of the vertical lever O, pivoted at P to a bracket, Q, attached to the axle just inside of the wheel by a clip, and braced to the hounds by the rod R. The upper end of this lever is connected by the long rod S with the foot-lever T, near the front of the wagon-box, with which lever a notched catch-bar, U, is arranged in the ordinary way for holding the brakes on the wheels when brought against them by pushing the lever T forward.

This brake can be used with or without the wagon-box, by reason of the employment of the bar E for suspending the brake-bar when the box is removed, and the attachment of the supports for the brake-levers I and O to the axle. This latter also affords very substantial connections, whereby the apparatus is made more durable than it can be when otherwise arranged.

Having thus described our invention, we claim as new and desire to secure by Letters Patent—

1. The lever-support K and bar E, connected by the brace-rod M, substantially as specified.

2. The brake-bar A, suspended in the manner described, and connected to the lever I by the yoke H, and said lever I connected by the rod N to the vertical lever O, whose upper end is connected to the long rod S, operated by the foot-lever, all as represented in the drawing.

JOSEPH PAVEY.
MARSHALL MARTIN.

Witnesses:
JAS. D. MIX,
J. M. VANSYCKLE.